United States Patent Office 3,043,672
Patented July 10, 1962

3,043,672
SUBSTITUTED CATECHOL ANTIOXIDANTS
George G. Ecke, Ferndale, and Alfred J. Kolka, Birmingham, Mich., assignors to Ethyl Corporation, New York, N.Y., a corporation of Delaware
No Drawing. Filed Aug. 22, 1956, Ser. No. 605,481
7 Claims. (Cl. 44—69)

This invention relates to the protection of organic material normally tending to deteriorate in the presence of air. More particularly, this invention relates to the protection of organic hydrocarbons and polymers against oxidative deterioration.

This application is a continuation-in-part of application Serial No. 426,556, filed April 29, 1954, now U.S. Patent No. 2,831,898.

Most organic materials deteriorate to varying degrees on exposure to air or oxygen, and the deterioration has a variety of harmful effects depending on the use to which the organic material is put.

Thus, oxidative deterioration of liquid hydrocarbon fuels destroys valuable combustion characteristics of the fuel and renders it less effective for its intended purpose. Lubricating oils prepared from crude petroleum tend to partially oxidize under service conditions to form acids which are highly corrosive and cause excess engine wear.

High molecular weight hydrocarbon polymers such as natural rubber, polystyrene, polybutadiene, polyisobutylene, polyethylene, butyl rubber, isobutylene-styrene copolymers, GR–S rubbers and the like are susceptible to oxidative deterioration particularly when subjected to elevated temperatures and the action of light. When the polymers contain olefinic-type linkages one point of attack is the double bonds. However, in such unsaturated polymers and in polymers which do not contain olefinic-type linkages there is another different and serious type of deterioration. This results from free radical formation within the polymers, which formation is promoted by oxygen or ozone and catalyzed by heat, light and/or impurities such as metals and metal compounds. The free radicals which are formed readily undergo chemical reaction with the polymer itself. Undesirable chemical and physical transformations are the result. Thus, hydrocarbon polymers deteriorate prematurely, lose tensile strength and other desirable properties such as pliability, flexibility or the like depending upon the polymer in question, and become discolored and embrittled.

An object of this invention is to provide means for protecting organic material which normally deteriorates in or is affected adversely by oxygen. Another object is to provide solid hydrocarbon polymers protected against deterioration in the presence of oxygen or ozone. A further object is to provide means for reducing the antioxidant requirement of inherently unstable organic material. Other important objects of this invention will become apparent from the ensuing description.

According to this invention the above and other objects are accomplished by providing an organic material normally susceptible to oxidative deterioration containing, in amount sufficient to inhibit such deterioration, a small antioxidant quantity of a 3,5-dialkyl catechol having alkyl groups containing from 4 to 10 carbon atoms characterized in that said alkyl groups contain a branched chain on the carbon atom immediately adjacent the benzene nucleus. Examples of these compounds are 3,5-di-(1',1'-dimethylnonyl) catechol, 3,5 - di - (1',1'-dimethylhexyl) catechol, 3,5-di-(1',1'-dimethylpropyl) catechol and the like.

The 3,5-dialkyl catechols which are used in the practice of this invention are conveniently prepared by reacting a secondary or tertiary alkyl halide with catechol in the presence of fused zinc chloride as a catalyst and absolute ethanol as a solvent. Thus, for example, 3,5-di-tert-butyl catechol which is a crystalline solid melting at 98 to 100° C., is prepared by reacting catechol with tert-butyl chloride in the presence of fused zinc chloride and absolute ethanol.

Among the organic materials that can be protected by the practice of this invention are petroleum products, pure organic chemicals, animal and vegetable matter, and natural and synthetic high molecular weight polymers.

A preferred embodiment of this invention is gasoline, normally tending to deteriorate in the presence of air, protected by a small antioxidant quantity of a 3,5-dialkyl catechol. The term "gasoline" pertains to a liquid hydrocarbon and is inclusive of mixtures of aliphatic, olefinic, aromatic and naphthenic hydrocarbons derived from mineral sources such as petroleum, coal, shale and tar sands, and which may include straight run, reformed, cracked and alkylated stocks, etc., and mixtures of these. The initial boiling point can be from about 70 to about 90° F. and the final boiling points vary from less than 300 to more than 437° F.

As used in the description and claims herein, the term "hydrocarbon polymer" means a polymer which is essentially hydrocarbon in nature but includes polymers which contain relatively small amounts of nitrogen or sulfur. Essentially hydrocarbon polymers containing relatively small amounts of nitrogen or sulfur in the molecule possess characteristics essentially analogous to true hydrocarbon polymers. GR–N which is a mixed polymer of butadiene and acrylonitrile serves as an example of a hydrocarbon polymer containing a small amount of nitrogen. Sulfur-vulcanized natural rubber is an example of a hydrocarbon polymer containing a small amount of sulfur.

A particularly preferred embodiment of this invention is polyethylene containing a small antioxidant quantity of 3,5-di-tert-butyl catechol.

Typical stabilized hydrocarbon polymers of this invention are illustrated by the following specific examples wherein all parts and percentages are by weight.

*Example I*

To a synthetic rubber master batch comprising 100 parts of GR–S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 3,5-di-(1',1',2',2'-tetramethylpropyl) catechol. This batch is then cured for 60 minutes at 45 pounds per square inch of steam pressure.

*Example II*

Two parts of 3,5-di-(1',2'-dimethylbutyl) catechol is incorporated in 100 parts of raw butyl rubber prepared by the copolymerization of 90 percent of isobutylene and 10 percent of isoprene and having an average molecular weight of 100,000.

*Example III*

To 200 parts of raw butyl rubber having an average molecular weight of 600,000 and prepared by copolymerizing 95 percent of isobutylene and 5 percent of butadiene is added 1.5 parts of 3,5-di-tert-butyl catechol.

*Example IV*

To a master batch of GR–N synthetic rubber comprising 100 parts of GR–N rubber having an average molecular weight of 75,000, 5 parts of zinc stearate, 50 parts of carbon black, 5 parts of road tar, 2 parts of sulfur and 2 parts of mercaptobenzothiazole is added 5 percent base on the weight of the batch of 3,5-di-tert-butyl catechol.

Example V

To 1000 parts of polyethylene produced by oxygen catalyzed reaction under a pressure of 20,000 atmospheres and having an average molecular weight of 40,000 is added and mixed 2 parts of 3,5-di-tert-butyl catechol.

Example VI

A dry blend of polystyrene and 3,5-di-(1'-methyloctyl) catechol is prepared by mixing 1 part of the catechol with 100 parts of polystyrene having an average molecular weight of 50,000.

Example VII

To natural rubber (Hevea) is added 0.02 percent of 3,5-di-tert-butyl catechol.

The above examples illustrate improved polymer compositions of this invention. Other such compositions and the methods of preparing the same will now be apparent to one skilled in the art.

The following examples illustrate the practice of this invention applied to other organic materials normally tending to deteriorate in the presence of air or oxygen.

Example VIII

To 1000 parts of a gasoline having 39.1 percent paraffins, 21.0 percent olefins, 17.1 percent aromatics and 22.8 percent naphthenes, an initial evaporation temperature of 88° F. and a final evaporation temperature of 426° F. is added 1 part of 3,5-di-tert-butyl catechol. The mixture is agitated to dissolve the 3,5-di-tert-butyl catechol in the fuel, and the resulting composition is extremely resistant to oxidative deterioration.

Example IX

To 1000 parts of a gasoline having 44.0 percent paraffins, 17.9 percent olefins and 38.1 percent aromatics, an initial evaporation temperature of 94° F. and a final evaporation temperature of 119° F. is added 10 parts of 3,5-di-(1'-ethylpropyl) catechol. The mixture is agitated to dissolve the 3,5-di-(1'-ethylpropyl) catechol. The resulting fuel has an excellent stability to oxidative deterioration.

Example X

To 5000 parts of a liquid hydrocarbon fuel having 49.7 percent paraffins, 22.3 percent olefins and 28.0 percent aromatics, an initial evaporation temperature of 81° F. and a final evaporation temperature of 410° F. is added 25 parts of 3,5-di-(1'-methylnonyl) catechol. The fuel is agitated to dissolve the mixture. The resulting fuel is stable to oxidative deterioration.

Example XI

To 1000 gallons of the fuel described in Example IX is added 300 milliliters of tetraethyllead, 0.5 theory of bromine as ethylene dibromide, 1.0 theory of chlorine as ethylene dichloride and 9 grams of 3,5-di-tert-butyl catechol. The mixture is agitated until a homogeneous oxygen stable solution of all the ingredients is achieved.

Example XII

To 100 parts of a commercially available diesel fuel having a cetane number of 51.7 and a 50 percent evaporation temperature of 509° F. is added 3 parts of 3,5-di-tert-butyl catechol. The resulting fuel is stable to oxidative deterioration.

Example XIII

To 1000 parts of a kerosene-type liquid hydrocarbon fuel having an initial evaporation temperature of 325° F. and a final evaporation temperature of 385° F. is added 6 parts of 3,5-di-(1'-ethyl-2'-methylpentyl) catechol. The mixture is agitated until a homogeneous oxygen stable solution of the ingredients is achieved.

Example XIV

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 3,5-di-tert-butyl catechol. The resulting composition is stable for long periods when exposed to air.

To illustrate the enhanced oxygen resistance of the hydrocarbon polymer compositions of this invention, comparative tests are conducted on base stocks which are identical except for the inclusion therein of a 3,5-dialkyl catechol. One requisite of such stocks is that the desirable properties incorporated therein by careful selection of the compounding ingredients and cure time shall be maintained during extended periods of storage or use in the presence of oxygen. Comparison of various stocks is best carried out on stocks initially having the same state of cure. The most reliable means for determining the state of cure is by the T–50 test, ASTM Standards for 1952, part 6. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 percent of the original elongation and is, therefore, referred to as the T–50 value. For example, stocks for testing and comparison are cured for a time sufficient to have a T–50 of —4.5° C. so that a valid comparison of the properties can be made. The accelerated aging is conducted by the procedure of ASTM designation: D–572–52, described in the ASTM Standards for 1952, part 6, for a period of 96 hours at a temperature of 70° C. with an initial oxygen pressure in the test bomb of 300 pounds per square inch gauge on specimens having the following composition:

| | Parts by weight |
|---|---|
| Smoked sheets | 100.00 |
| Carbon black | 45.00 |
| Zinc oxide | 5.00 |
| Stearic acid | 3.00 |
| Pine tar oil | 2.00 |
| Sulfur | 3.00 |
| Mercaptobenzothiazole | 0.65 |
| | 158.65 |

To demonstrate the protection afforded to the rubber by the inhibitor of this invention, the tensile strength and the ultimate elongation of stocks prepared by the addition of an inhibitor of this invention are determined before and after aging. These properties are compared with the same properties determined on an identical rubber stock not protected by an inhibitor. Both of these properties are determined by means of the test procedure of ASTM designation: D–412–51T, fully described in ASTM Standards for 1952, part 6. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance. The tests show that a 3,5-dialkyl catechol is effective in promoting retention of the tensile strength and ultimate elongation over the control samples which contained no protective additive.

3,5-di-tert-butyl catechol finds particular utility in the stabilization of light colored hydrocarbon polymers where non-staining characteristics of the inhibitor are essential.

To illustrate the non-staining characteristics of the above-described phenolic inhibitors in the protection of light colored stocks the following base formula is used:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.10 |
| Sulfur | 3.00 |
| Mercaptobenzothiazole | 1.00 |
| | 181.10 |

To the above base formula is added 1 part by weight of 3,5-di-tert-butyl catechol and the sample is cured for 45 minutes at 274° F. using perfectly clean molds with no mold lubricant. After curing, a sample of the above protected light colored stock is exposed for 24 hours using a discoloration weatherometer so as to determine the amount of discoloration which occurred during this period of time. It is found that the presence of 3,5-di-tert-butyl catechol in this light colored stock causes essentially no discoloration.

Another cured sample of the above light colored stock containing 3,5-di-tert-butyl catechol is subjected to a test procedure designed to determine the amount of migration staining. In this test, a piece of the above cured sample is placed between two steel panels which have been painted with enamel and allowed to dry. This sample is then exposed for 48 hours at 212° F. in a hot air oven using a 5 pound weight on the panels to maintain rubber-to-metal contact. On completion of this test it is found that essentially no migration staining has occurred.

To further illustrate the outstanding potency of the inhibitors of this invention in retarding oxidative deterioration of hydrocarbon polymers comparative tests are conducted using polyethylene. In these tests measurements are made of the amount of oxygen absorbed by a polyethylene film at 160° C. In these tests commercially available polyethylene which is free of inhibitor is used. Master batches of this polyethylene are prepared using differential mill rolls to effect thorough mixing of antioxidant ingredients. The antioxidants employed are 3,5-di-tert-butyl catechol and 2,6-di-tert-butyl-4 - methylphenol, a widely used phenolic antioxidant. Master batches of these antioxidants in polyethylene are made containing 1 percent by weight of the additive. Portions of these are then diluted in polyethylene on differential mill rolls to obtain a concentration of 0.05 percent by weight of 3,5-di-tert-butyl catechol and 0.10 percent by weight of 2,6-di-tert-butyl-4-methylphenol. Milled sheets are also made of the same polyethylene without stabilizer to serve as a control.

Pressings 0.015 inch to 0.025 inch thick are made of each of the above named samples and these are individually laid out on pieces of aluminum foil. The weights are recorded and the samples are all put into a circulating air oven set at 160° C. Periodically, the samples are removed and weighed and the amount of oxygen absorbed by the polyethylene is determined by the increase in the weight of the samples. In all instances the surface areas of each sample are essentially equal because the degree of oxygen absorbed is dependent upon the amount of exposed surface area. It is found that after one hour in the oven the unprotected polyethylene increases in weight by 0.04 gram. In this same period the polyethylene containing 0.10 percent by weight of 2,6-di-tert-butyl-4-methylphenol increases in weight to the extent of 0.01 gram. In contradistinction the polyethylene which contained only 0.05 percent by weight of 3,5-di-tert-butyl catechol exhibits no appreciable gain in weight showing that the sample has not absorbed a measurable amount of oxygen in this period of time. After a longer period of exposure to the above described test the weight changes show even more clearly the great difference in effectiveness of the 3,5-di-tert-butyl catechol. Thus, it can be seen that 3,5-di-tert-butyl catechol is considerably more effective than 2,6-di-tert-butyl-4-methylphenol in inhibiting oxygen absorption of polyethylene even when used at ½ the concentration. Moreover, it is to be noted that the polyethylene samples not of this invention exhibit a definite color change much earlier than the polyethylene stabilized according to this invention. This color change—a decided darkening to a strong yellow color—is indicative of the amount of oxidative deterioration which occurs during the tests.

It can be seen from the results described above that 3,5-dialkyl catechols are unusually effective in preventing oxidative deterioration of hydrocarbon polymers. In addition to this great effectiveness the inhibitors of this invention possess additional important advantages. For example, the inhibitors of this invention are highly compatible with the hydrocarbon polymers in question and thus can be employed therein in higher concentration than inhibitors suggested heretofore. This enables the achievement of greatly increased resistance to oxidative deterioration. This high compatibility is due to the combination of the particular chemical structure of the inhibitors of this invention. The inhibitors of this invention also have the decided advantage of possessing non-staining characteristics. This markedly enhances their utility in various hydrocarbon polymers which are used in applications where discoloration is offensive and intolerable.

The amount of the inhibitors of this invention employed in hydrocarbon polymers varies from about 0.01 to about 5 percent by weight of the material stabilized depending upon the nature of the polymer and the conditions of service to be encountered. Thus, in the stabilization of natural and synthetic rubber to be used in the manufacture of tires which are normally subjected to exposure to the elements as well as to the action of sunlight, frictional heat, stress and the like, the use of relatively high concentrations of 3,5-dialkyl catechols is advantageous. On the other hand, when the article of manufacture is not to be subjected to such severe conditions, such as in the case of molded goods fabricated from polyethylene, relatively low concentrations of 3,5-dialkyl catechol can be successfully utilized.

As stated above, 3,5-dialkyl catechols are valuable antioxidants in organic material normally tending to deteriorate in the presence of oxygen. It has been found in particular that these compounds are excellent antioxidants in liquid hydrocarbon fuels containing olefinic organic constituents. In particular, outstanding results are achieved when 3,5-di-tert-butyl catechol is added to gasoline normally tending to deteriorate in the presence of air. To demonstrate this superiority as an antioxidant comparative tests were conducted using a representative unsaturated hydrocarbon, 2,4,4-trimethylpentene-1, which is found in many cracked gasolines. For comparative purposes, 3,5-di-tert-butyl catechol and 4-methyl-2,6-di-tert-butyl phenol were tested in separate portions of the hydrocarbon. The test procedure was the standard method of the American Society for Testing Materials for the determination of the oxidation stability of gasoline (Induction Period Method) ASTM designation: D–525–46, as fully described in part III–A, ASTM Standards for 1946. According to this method, the induction period is the period during which there is no drop in pressure indicating no absorption of oxygen, when the test material is placed in a test bomb maintained at a temperature of 100° C. with an initial pressure of 100 pounds per square inch gauge of oxygen.

The materials tested for antioxidant activity were added to the 2,4,4-trimethylpentene-1 in amount sufficient to give a composition containing 4 milligrams of antioxidant per 100 milliliters of the hydrocarbon. Comparative ratings were established by dividing the induction period of each antioxidant-containing sample by the induction period of a sample of 2,4,4-trimethylpentene-1 which contained no added antioxidant. The results of these tests are summarized in Table I.

TABLE I

*Antioxidant Activity in 2,4,4-Trimethylpentene-1*

| Antioxidant | Induction Period, Minutes | Rating |
|---|---|---|
| None | 95 | 1 |
| 3,5-di-tert-butyl catechol | 1,440+ | 15+ |
| 4-Methyl-2,6-di-tert-butyl phenol | 405 | 4.4 |

The data in Table I indicate that 3,5-di-tert-butyl catechol is a superior antioxidant in an unsaturated hydrocarbon, and that this compound has a far greater antioxidant activity than 4-methyl-2,6-di-tert-butyl phenol, which compound is a standard, widely used commercial antioxidant. It should be pointed out that the 3,5-di-tert-butyl catechol test was discontinued after 1440 minutes, at which time there was no evidence of any decrease in the oxygen pressure. The true rating for this compound is therefore, greater than indicated in the table.

The 3,5-dialkyl catechols also find use in the stabilization of other hydrocarbon containing materials normally susceptible to oxidative deterioration. The compounds are particularly effective in stabilizing edible fats and oils of animal or vegetable origin and which tend to become rancid especially during long periods of storage prior to use. Typical representatives of these edible fats and oils are linseed oil, cod liver oil, castor oil, soya bean oil, rapeseed oil, coconut oil, olive oil, palm oil, sesame oil, corn oil, peanut oil, babassu oil, butter, fat, lard, beef tallow and the like.

The following examples illustrate typical edible compositions protected by a 3,5-dialkyl catechol of this invention.

*Example XV*

Two parts of 3,5-di-(1-methylpentyl) catechol are blended with 10,000 parts of lard. The resulting protected lard is stable over long storage periods in contradistinction to the unprotected product.

*Example XVI*

To 5,000 parts of olive oil is added 1 part of 3,5-di-tert-butyl catechol and the mixture is agitated to produce a homogeneous blend which is stable to oxidative deterioration for a long period.

When the 3,5-dialkyl catechols are used as antioxidants to protect organic material normally tending to deteriorate in the presence of air, they are included in amounts from about 0.01 to about 5 percent by weight of the material to be protected. In petroleum products from about 0.01 to about 2 percent by weight of a 3,5-dialkyl catechol gives a satisfactory result. However, for most normal purposes, amounts between 0.05 and 1.0 percent are sufficient.

We claim:
1. An organic material selected from the class consisting of a hydrocarbon polymer normally susceptible to oxidative deterioration and hydrocarbon fuel mixtures normally tending to deteriorate in the presence of air; said material containing, in amount sufficient to inhibit said deterioration, a small antioxidant quantity, up to about 5 percent, of 3,5-dialkyl catechol having alkyl groups containing from 4 to 10 carbon atoms, characterized in that said alkyl groups contain a branched chain on the carbon atom immediately adjacent the benzene nucleus.

2. A liquid hydrocarbon fuel mixture normally tending to deteriorate in the presence of air containing a small antioxidant quantity, up to about 5 percent, of a 3,5-dialkyl catechol having alkyl groups containing from 4–10 carbon atoms, characterized in that said alkyl groups contain a branched chain on the carbon atom immediately adjacent the benzene nucleus.

3. The fuel composition of claim 2 wherein the antioxidant is 3,5-di-tert-butyl catechol.

4. Gasoline normally tending to deteriorate in air containing about three milliliters of tetraethyllead per gallon of fuel, from about 0.01 to about 2 percent by weight of 3,5-di-alkyl catechol having alkyl groups containing from 4–10 carbon atoms characterized in that said alkyl groups contain a branched chain on the carbon atom immediately adjacent the phenolic nucleus, and a scavenging amount of an ethylene dihalide.

5. The fuel composition of claim 4 wherein the di-alkyl catechol is 3,5-di-tert-butyl catechol.

6. A hydrocarbon polymer normally susceptible to oxidative deterioration containing, in amount sufficient to inhibit said deterioration, a small antioxidant quantity up to about 5 percent of 3,5-di-alkyl catechol having alkyl groups containing from 4 to 10 carbon atoms characterized in that said alkyl groups contain a branched chain on the carbon atom immediately adjacent the benzene nucleus.

7. Polyethylene containing a small antioxidant quantity up to about 5 percent of 3,5-di-tert-butyl catechol.

References Cited in the file of this patent

UNITED STATES PATENTS

| | | |
|---|---|---|
| 1,945,521 | Downing et al. | Feb. 6, 1934 |
| 2,116,220 | Shoemaker | May 3, 1938 |
| 2,181,102 | Stoesser | Nov. 21, 1939 |
| 2,264,896 | Bahlke | Dec. 2, 1941 |
| 2,304,466 | Matheson | Dec. 8, 1942 |
| 2,439,421 | Erickson | Apr. 13, 1948 |
| 2,455,746 | Erickson | Dec. 7, 1948 |
| 2,610,983 | Slorin | Sept. 16, 1952 |
| 2,829,175 | Bowman et al. | Apr. 1, 1958 |

OTHER REFERENCES

Boundy-Boyer: Styrene, Its Polymers and Derivatives, pages 21, 204, 714, Reinhold Pub. Corp. N.Y. (1952).

Kluchesky et al.: Ind. and Eng. Chem., pages 1768–71, 41 (1949).

Raff et al.: "Polyethylene," page 103, Interscience (1956).